(No Model.)
H. J. BELL.
AIR REGULATING DEVICE FOR ATMOSPHERIC GAS BURNERS.
No. 400,174. Patented Mar. 26, 1889.
Fig. 1.
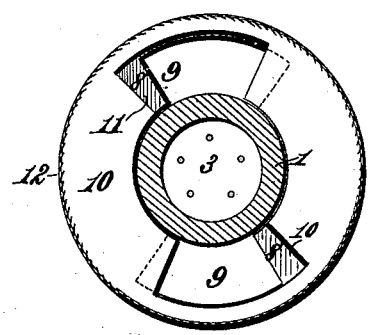
Fig. 2.
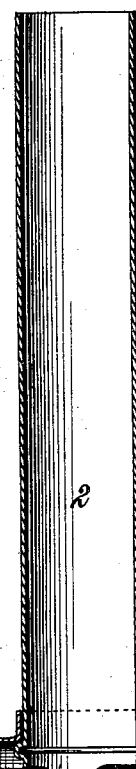
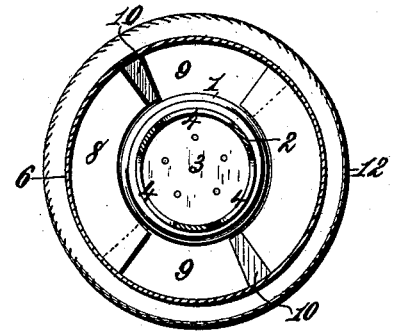
Fig. 3.
Witnesses.
Robert Pratt,
J. A. Rutherford.
Inventor
Harold J. Bell,
By
James L. Norris.
Atty

UNITED STATES PATENT OFFICE.

HAROLD J. BELL, OF GLOUCESTER CITY, NEW JERSEY, ASSIGNOR TO THE WELSBACH INCANDESCENT GAS LIGHT COMPANY, OF NEW JERSEY.

AIR-REGULATING DEVICE FOR ATMOSPHERIC GAS-BURNERS.

SPECIFICATION forming part of Letters Patent No. 400,174, dated March 26, 1889.

Application filed July 31, 1888. Serial No. 281,489. (No model.)

*To all whom it may concern:*

Be it known that I, HAROLD J. BELL, a citizen of the United States, residing at Gloucester City, in the county of Camden and State of New Jersey, have invented new and useful Improvements in Air - Regulating Devices for Atmospheric Gas-Burners, of which the following is a specification.

My invention relates to devices for regulating the admission of air to atmospheric gas-tubes and burners and for preventing the flashing back of the ignited mixture of gas and air.

The object of my invention I accomplish by the features of construction and combination of devices hereinafter described and claimed, reference being made to the accompanying drawings, in which—

Figure 1 is a vertical section of an atmospheric gas-tube provided with my improved devices for regulating the admission of air. Fig. 2 is a bottom plan in section on the line *y y* of Fig. 1. Fig. 3 is a section on the line *x x* of Fig. 1.

The numeral 1 designates the usual tubular base, thimble, or pillar for attachment to a gas-fixture, 2 the atmospheric gas-tube supported in or upon said thimble, and 3 the usual perforated disk secured in the thimble at the lower end of said tube.

In the lower part of the tube 2, above the perforated disk 3, are formed a number of air-inlets, 4, which are preferably elongated in a vertical direction, as shown in Fig. 1, so as to afford ample access for air without weakening the tube.

On the outside of the tube 2, above the inlets 4, is spun an annular shoulder, 5, which serves as a support for a bell-shaped shield, 6, that extends outward and downward to about midway the height of the tubular base or thimble. The lower edge of this shield is formed with an annular laterally-projecting flange, 7, over and around which is spun the periphery of a disk, 8, which closes the lower end of said shield. The disk 8 has a central circular opening, which closely surrounds the thimble or tubular base 1, and from this central opening extend two or more radial openings, 9, preferably segmental in form, for the admission of air to the interior of the bell-shaped shield, and thence to the atmospheric gas-tube. The disk 8 is securely fastened to the lower end of the shield, so as not to be liable to turn thereon. Beneath the fixed disk 8 and spun loosely around its periphery is a rotatable disk or damper, 10, which has a central opening that loosely surrounds the tubular base 1, and said disk 10 is also formed with two or more openings, 11, corresponding with the openings 9 in the fixed disk 8 and capable of registering therewith. The annular turned-over portion 12 of the movable disk 10 is preferably milled or roughened to facilitate the rotation of said movable disk. By turning the disk 10 to the right or left, as required, the openings 8 and 9 can be entirely closed or be made to register more or less, so as to regulate the admission of air through the bell-shaped shield 6 to the atmospheric gas-tube.

By this construction and arrangement of devices the quantity of air admitted to the gas-tube can be controlled with ease and accuracy without disturbing the burner, while the nearly-closed bell-shaped shield will obviate the disturbing influence of air-drafts and prevent the flashing back of the gas when turned on and ignited.

What I claim is—

The combination, with an atmospheric gas-tube having lateral air - inlets, and a bell-shaped shield, 6, supported on said tube above the air-inlets, surrounding and extending below the latter, and provided at its lower edge with an annular laterally-projecting flange, 7, of a stationary perforated disk, 8, having its periphery spun over and around said flange, and a rotatable perforated disk, 10, having a turned-over edge, 12, loosely spun around the periphery of the stationary disk to regulate the admission of air into the atmospheric gas-tube, substantially as described.

In testimony whereof I affix my signature in presence of two witnesses.

H. J. BELL.

Witnesses:
MORRIS R. BOCKINS,
RANDAL MORGAN.